United States Patent [19]
Savidge

[11] Patent Number: 6,019,145
[45] Date of Patent: Feb. 1, 2000

[54] APPARATUS AND METHOD OF INTRODUCING A FREE-FLOWING BALANCING MATERIAL WITHIN A TIRE

[75] Inventor: Ian Savidge, Bramton, Canada

[73] Assignee: 1003144 Ontario Inc., Canada

[21] Appl. No.: 08/962,462

[22] Filed: Oct. 31, 1997

[30] Foreign Application Priority Data

Oct. 31, 1996 [CA] Canada ................................ 2189290

[51] Int. Cl.[7] .................................................. B65B 1/04
[52] U.S. Cl. .......................... 141/38; 141/67; 141/100; 152/154.1; 156/75
[58] Field of Search .................................. 141/1, 4, 5, 9, 141/38, 67, 100, 102, 105; 152/154.1; 156/75; 222/630, 637

[56] References Cited

U.S. PATENT DOCUMENTS

| | | | |
|---|---|---|---|
| 4,721,126 | 1/1988 | Horii | 137/1 |
| 5,073,217 | 12/1991 | Fogal | 156/75 |
| 5,222,529 | 6/1993 | Zoltan et al. | 141/4 |
| 5,386,857 | 2/1995 | Fogal et al. | 141/5 |
| 5,472,023 | 12/1995 | Fogal et al. | 141/9 |

*Primary Examiner*—Steven O. Douglas
*Attorney, Agent, or Firm*—Jon Carl Gealow

[57] ABSTRACT

An apparatus is disclosed for introducing a free-flowing balancing material into a tire through a tire valve stem. The apparatus comprises a container for confining a predefined amount of free-flowing balancing material, and a flow path for pressurized air which extends from the source of the pressurized air to an air inlet, from the air inlet to a mixing chamber in communication with the container through an opening, and from the mixing chamber to an air outlet. The flow path has a pressure regulator therein, a venturi nozzle within the mixing chamber to accelerate the air flow and lower the air pressure within the mixing chamber to draw the free-flowing balancing material from the container into the mixing chamber; and a chuck for introducing the mixture of free-flowing balancing material and pressurized air from the air outlet and into a tire valve stem. The volume of the container is large enough to contain an amount of free-flowing balancing material sufficient to effect dynamic balancing of a tire and associated wheel assembly.

9 Claims, 3 Drawing Sheets

APPARATUS AND METHOD OF INTRODUCING A FREE-FLOWING BALANCING MATERIAL WITHIN A TIRE

FIELD OF THE INVENTION

This invention relates to an improved apparatus and method of introducing a free-flowing balancing material within a tire casing.

BACKGROUND OF THE INVENTION

Most tire and rim assemblies require balancing to prevent vibration within the vehicle while it is in motion. One method of balancing tire and rim assemblies involves rotation of the assembly on a computerized balancing machine to determine the location and size of weights necessary to obtain balanced rotation. Lead weights of the determined size are then clamped to the assembly at the indicated points to complete the balancing procedure. There are other similar 'fixed weight' systems known for tire balancing. Some disadvantages of this type of system are that tire balancing equipment is expensive, tire balancing requires a skilled operator and is time consuming, and tires must be rebalanced at regular intervals due to effects of varying tread wear.

Continuous self-balancing systems overcome many of the disadvantages of the above fixed weight systems. Continuous self-balancing systems use the principle that free flowing materials contained in a vessel in rotation will seek a distribution in balance about the centre of rotation and will tend to offset, by mass damping, any imbalance inherent in the vessel. The effectiveness of a dynamic self-balancing system is dependent in part on the ease with which balancing material can move within the vessel to positions that offset points of imbalance.

One method for applying the self balancing principle was disclosed in the International Publication Number WO 95/00347, by Heffernan et al. In this PCT patent application, a free flowing balancing material is placed directly within a pneumatic tire to obtain a dynamic balance while the wheel is in rotation. The balancing material comprises a mixture of small dense beads and larger less dense beads which distribute within the tire under centrifugal forces to dampen vibration. The beads of the mixture are of a substantially rounded shape to reduce friction and improve the mobility of the material during balancing.

As the tire rotates, the small dense beads are forced against the tire casing to fill in imperfections or voids on the tire wall to form a smooth lining allowing the larger less dense beads to move easily to points of imbalance and dampen vibrational energy.

One method of introducing free-flowing tire balancing material into the tire casing is to pour the material into the tire casing during the installation of the tire onto the rim. Although this method is simple, it requires the tire to be dismounted from the rim, which normally occurs only during installation of a new tire, and, it is easy for the balancing material to adhere to the rim seat and prevent the tire from properly sealing against the rim.

Alternative methods are disclosed by Fogal et al. in U.S. Pat. No. 5,386,857 and U.S. Pat. No. 5,472,023. In these patents, a pulverulent material is introduced into a cylindrical chamber having axially spaced and radially offset inlets and outlets, subjecting the confined pulverulent material to pressurized air which is transformed into a cyclonic air current within the chamber by the radially offset inlet and outlet, and forcefully driving the admixed air/pulverulent material from the chamber into a tire through the associated tire valve stem.

SUMMARY OF THE INVENTION

This invention discloses an apparatus for introducing a free-flowing balancing material into a tire through a tire valve stem comprising:
- (a) a container for confining a predefined amount of free-flowing balancing material; the container having means for introducing the free-flowing balancing material into the container, and an opening through which the free-flowing balancing material is drawn when subjected to pressurized air currents;
- (b) a source of pressurized air;
- (c) a flow path for the pressurized air extending from the source of pressurized air to an air inlet, from the air inlet to a mixing chamber in communication with the container through the opening, and from the mixing chamber to an air outlet; the flow path having a pressure regulator therein;
- (d) a venturi nozzle within the mixing chamber to accelerate the air flow and lower the air pressure within the mixing chamber to draw the free-flowing balancing material from the container into the mixing chamber; and
- (e) means for introducing the mixture of free-flowing balancing material and pressurized air from the air outlet and introducing same into a tire through the associated tire valve stem.

The volume of the container is large enough to contain an amount of free-flowing balancing material sufficient to effect dynamic balancing of a tire and associated wheel assembly.

The apparatus of this invention has the container including a pressure equalizing tube extending from the air inlet into the container above the free-flowing balancing material to equalize the air pressure within the container to that entering the air inlet.

Further the air flow is directed through an air filter and drying element located between the air inlet and the venturi of the mixing chamber.

In the preferred embodiment of this invention the container includes a removable, sealable cap at the top thereof to allow for the introduction of free-flowing balancing material into the container.

This invention also relates to a method of introducing a free-flowing balancing material into a tire through a tire valve stem comprising the steps of:
- (a) confining a predetermined amount of free-flowing balancing material within a container having an opening at one end thereof;
- (b) creating a flow path for directing pressurized air by the opening of the container and having a venturi located upstream of the opening for creating a region of lower pressure within the flow path in the region of the opening for drawing the free-flowing balancing material out of the container and into the air flow path; and
- (c) directing the free-flowing balancing material in the air flow path into a tire through an associated tire valve stem.

The method also comprises the step of directing a portion of the pressurized air in the flow path and before the venturi, into the container above the free-flowing balancing material contained therein to equalize the air pressure within the container with the air pressure in the flow path.

DESCRIPTION OF THE INVENTION

Figure 1:
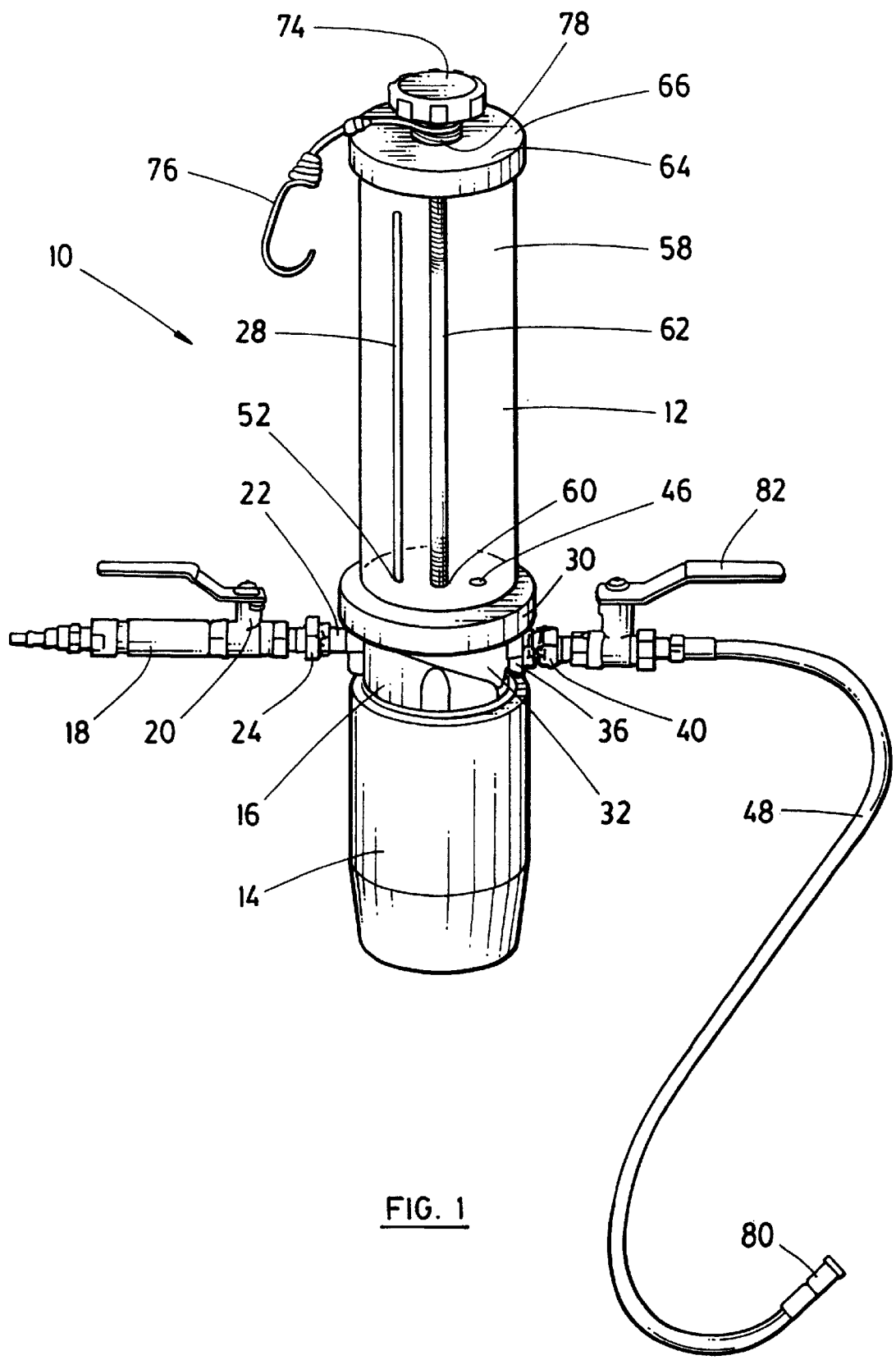
FIG. 1 is a perspective view of the apparatus of this invention for introducing a free-flowing balancing material within a tire casing.
Figure 2:
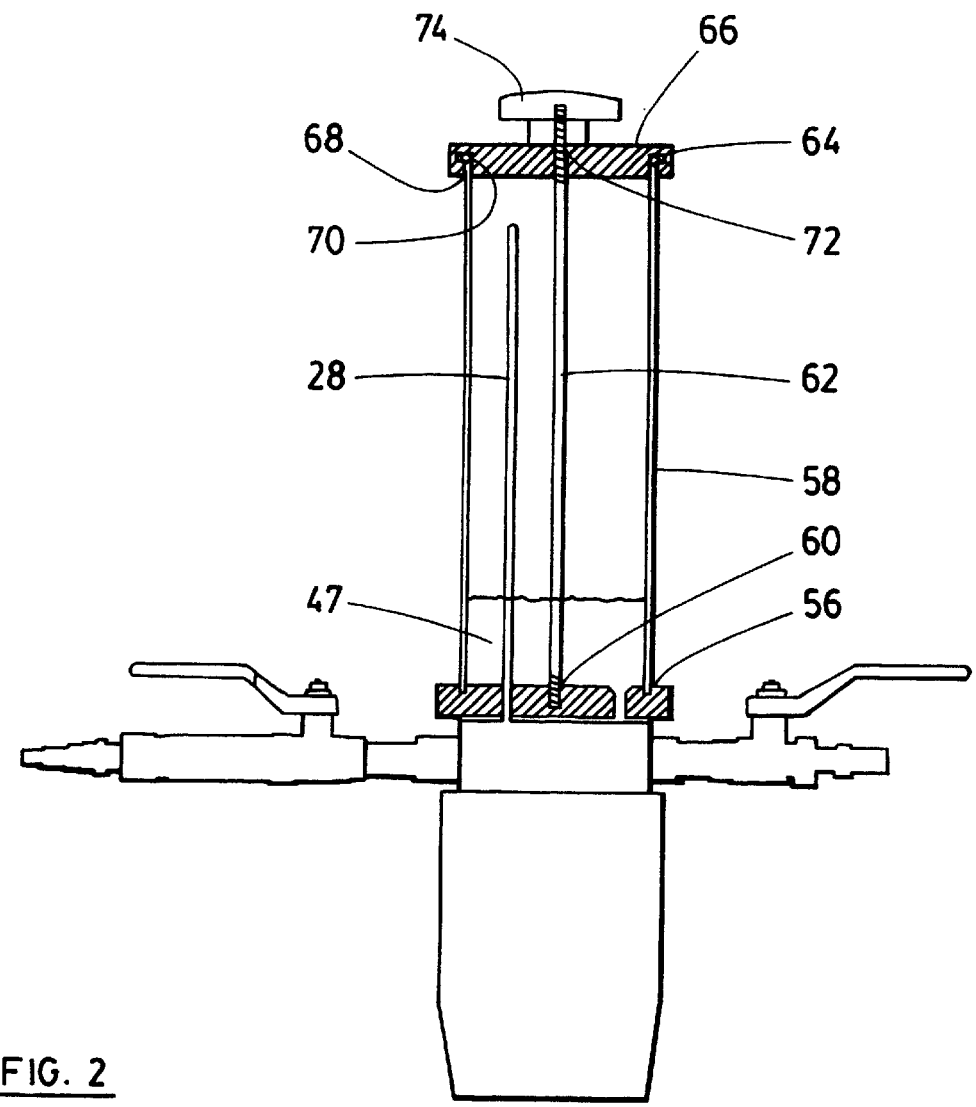
FIG. 2 is a side-sectional view of the apparatus of this invention.

This invention provides an improved apparatus (10) and method of introducing a free-flowing balancing material into a tire, eliminating any need for special skill or handling by the operator, yet will work with any free-flowing balancing material. The invention works on the venturi principle by which a vacuum is created in a mixing chamber through which the air stream passes. This allows a predetermined amount of balancing material to be drawn from a filling chamber positioned above the mixing chamber into the air stream for delivery into a tire.

The invention consists of a filling chamber (12) that is positioned vertically above an air drying filter (14) that is fitted with a filter head (16). A pressure regulator (18) is attached to an inlet ball valve (20) which is connected to an inlet port (22) on the filter head (16) by means of connecting nipple (24). When the inlet valve (20) is opened, pressurized air from an air compressor passes through the pressure regulator (18) and enters the inlet port (22) of the filter head.

Figure 3:
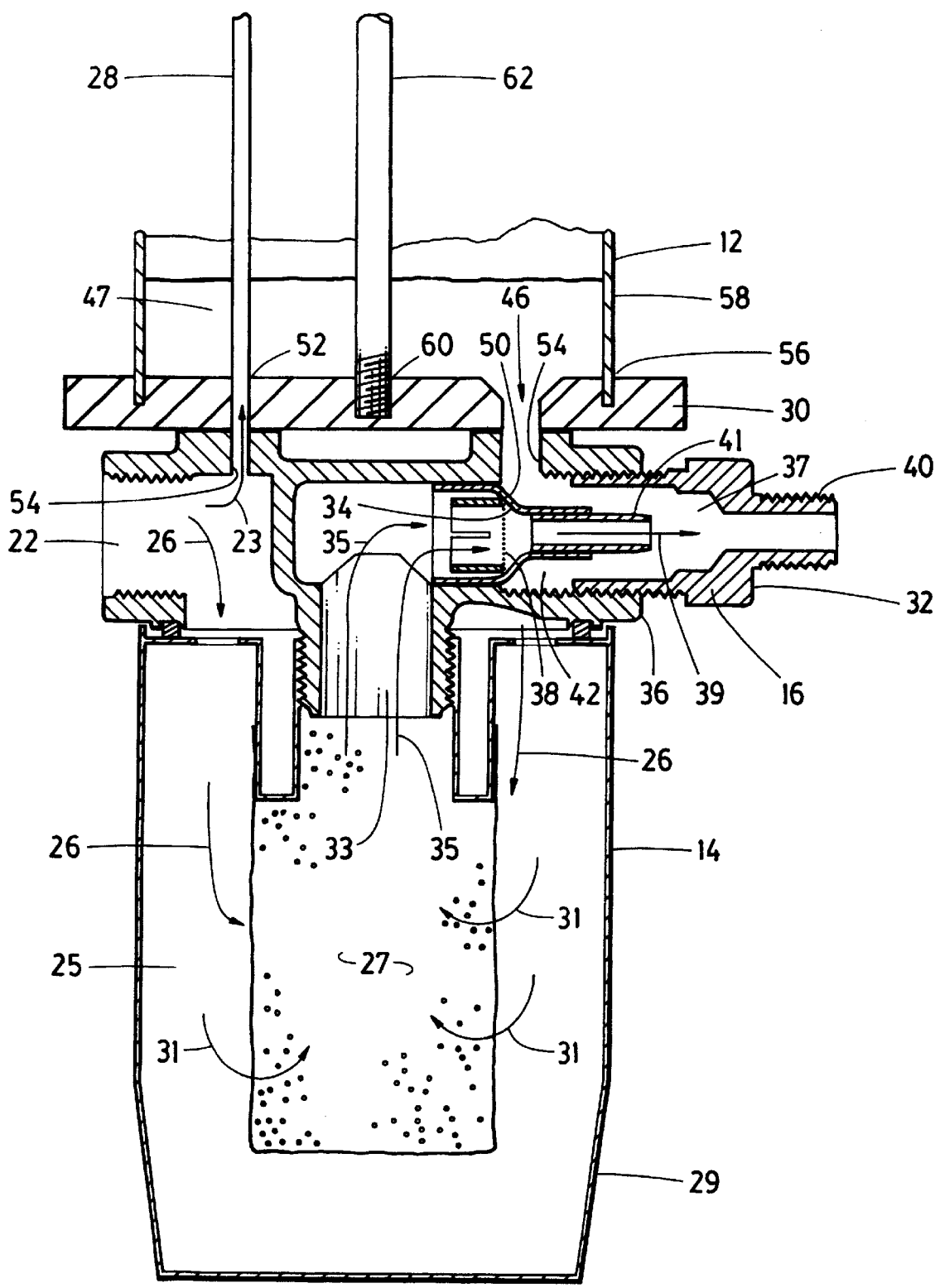
FIG. 3 is a cross-sectional view of the mixing chamber of the apparatus shown in FIG. 1.

As seen in FIG. 3, the air stream, upon entering inlet port (22), is directed downwards as at (26), into chamber (25) which is defined by the space surrounding generally cylindrical porous drying filter (27) and casing (29) of air drying filter (14). At the same time, a pressure equalizing tube (28) located in the base plate (30) of the filling chamber (12) and near the inlet port (22) directs a small amount of air upwards, as indicated by arrows (23), and above the free-flowing balancing material in the filling chamber (12). This equalizes the air pressure in the filling chamber (12) with the air pressure that is passing into the air drying filter (14). The air stream passes through porous filter (27) as at (31) and returns to the filter head (16) via central tube (33) as at (35) and into the outlet (32) of the filter head (16). The outlet (32) of the filter head (16) includes a mixing chamber (37), where the tire balancing material is drawn into the air stream from filling chamber (12), located thereabove, as will hereinafter be described.

A venturi nozzle (34) is positioned in the mixing chamber (37) and compresses the air flow (35) as it passes from the central tube (33), through the venturi (34), and exits tube (41), as indicated by arrows (39). Tube (41) is approximately half the diameter of the surrounding mixing chamber (37) and directs the air stream (39) towards outlet (32). Venturi nozzle (34) is preferably fitted snugly within the mixing chamber (37) so that any free-flowing balancing material cannot flow around the nozzle and back down to the air drying filter (14). Further, the venturi nozzle (34) is fitted with a porous metal filter (38) that prevents any particles of balancing material in the mixing chamber (37) from entering the air filter (14) through the venturi nozzle (34) - especially when the flow of air is stopped. The mixing chamber (37) is created by attaching a specially tapped outlet connecting nipple (40) to an outlet port (36) of the filter head (16), so that it surrounds the exit tube (41) of the venturi nozzle (34) but leaves a gap (42) between the outlet port (36) and the connecting nipple (40) and the tube (41) of the venturi nozzle (34). The gap (42) forms the mixing chamber (37).

The filling chamber (12) is positioned vertically above the filter head (16) and is constructed with an opening (46) that links the filling chamber (12) directly to the mixing chamber (37). The balancing material (47) is poured into the filling chamber (12) and is free to fall by gravity through the opening (46) and into the mixing chamber (37) at any time.

As can be seen in FIG. 3, tube (41) of the venturi nozzle (34) is positioned in the mixing chamber (37) below and at right angles to the opening (46) that connects the filling chamber (12) with the mixing chamber (37). In the preferred embodiment of this invention, the venturi nozzle (34) is in the shape of a curved or reducing coupling that compresses the air stream through a reduced opening towards the outlet connecting nipple (40), and, at the same time, by means of its sloped sides (50), allows the balancing material to fall by gravity into the mixing chamber (37) towards end (41) of the venturi nozzle (34). The air tube (41) on the venturi nozzle (34) is positioned ahead of the connecting opening (46), so that as airstream (39) passes from end (41) of the venturi nozzle (34) towards the outlet connecting nipple (40) a vacuum is created in the mixing chamber (37) which draws the balancing material (47) into the air stream (39). Once in the air stream the tire balancing material passes through the outlet of the filter head to a tire through a valve assembly, as will hereinafter be described.

The filter head (16) is of conventional design and, in the preferred embodiment, is manufactured by Zinga Industries as their part number ZAF-05-00-25. The filter head (16) consists of a cast-metal housing that is equipped with an inlet port (22) and an outlet port (36). The upper surface of the filter head (16) can be provided with two tapped ports (not illustrated), designed for the attachment of an inlet and outlet pressure gauge, as is well known in the art.

The air-drying filter (14) is of conventional design and, in the preferred embodiment, is manufactured by Waterguard Filters Inc. as their part number WG 40510SP. It is designed to screw into the base of the filter head (16) and can be replaced when the filter element is saturated with airborne water particles.

The filling chamber (12) features an aluminum base-plate (30) into which holes or openings are drilled to attach the plate to the filter head (16) as would be known to those skilled in the art. A further opening (52), is positioned over the inlet pressure gauge port (54) on filter head (16) and is tapped to accept pressure equalizing tube (28) that projects into the filling chamber (12). Tube (28) is approximately ⅛ inch diameter and approximately 7 inches in length. Opening (46), which is positioned over the outlet pressure gauge port (54) on filter head (16), is counterbored and links filling chamber (12) to the mixing chamber (37).

Also, a circular groove (56) of approximately 3 inch diameter is cut in the base-plate (30) and a polycarbonate tube (58) of 3 inch diameter is fitted into the groove (56). The polycarbonate tube (58) is sealed into groove (56) by means of a conventional sealant, such as Loctite( superflex sealant. The length of the polycarbonate tube (58) is variable, but will generally be in the range of from 6 to 10 inches long. A hole (60) is tapped into the centre of the base-plate (30) into which a threaded rod (62) is screwed. The upper end of filling chamber (12) is fitted with a cap (64) that consists of an aluminum plate (66) of similar size to the base-plate (30). Cap (64) includes a groove (68) which fits around polycarbonate tube (58). The base of the groove (68) is recessed, so that an O-ring (70) of suitable diameter is positioned in the groove (68) of cap (64) and free to rotate within the groove, but is prevented from falling out by the narrower diameter of the opening of the groove. The O-ring (70) provides an air-seal when the lid is tightened over the polycarbonate tube (58). Cap (64) has a central opening (72) with a knob (74) of suitable size fitted over the opening (72). The inside of knob (74) is threaded so that it will screw onto the threaded rod (62). The knob (74) is attached to the cap (64) by means of two screws, and an O-ring is positioned in a groove on the cap (64) so that an air-tight seal is obtained between the base of the knob (74) and the cap (64).

Finally, cap (64) is provided with a hook (76), attached by means of a rubber ring (78)—see FIG. 1—for hanging up the apparatus of this invention when not in use. Also, the air drying filter (14) can be provided with a stand (not illustrated) so that the apparatus of this invention can stand upright on a level surface.

In using the apparatus of the preferred embodiment of the invention, a user first attaches a suitable airline coupling (not illustrated) to the inlet end of the pressure regulator (18). The cap (64) is removed and the appropriate amount of the free-flowing balancing material is emptied into the filling chamber (12). Any excess balancing material around the top of the filling chamber is dusted off and the cap (64) is threaded over the rod (62) and hand-tightened until the cap (64) and filling chamber (12) are air-tight. A valve core (not illustrated) is removed from valve stem (not illustrated) in a tire assembly, as is well known in the industry, and the air pressure within the tire allowed to drop to 5 to 10 psi. The air hose (48) from the applicator (10) is then attached to the valve stem on the tire by means of the chuck (80) provided. The chuck (80) is drilled out, so that the balancing material and air can pass freely through the chuck and into the valve stem of the tire. Further, the airline from the compressor is attached to the coupling on the pressure regulator. The applicator (10) is then held in an upright position and the inlet valve (20) is opened. This pressurizes the filling chamber (12) and at the same time the initial air pressure blows the mixing chamber (37) clear of any balancing material (47) that may have dropped into the mixing chamber (37).

The outlet valve (82) is opened and the air is allowed to enter the tire. As the air passes through the mixing chamber (37), the air velocity increases as it passes through venturi nozzle (34) lowering the air pressure within the mixing chamber (37) and drawing the balancing material (47) from the filling chamber (12) into the air stream (39) and into the tire. In the space of less than one minute the filling chamber will be free from balancing material. If necessary, the applicator is slightly tipped to ensure that all the balancing material flows towards the exit hole and into the mixing chamber.

The tire can continue to be inflated through the applicator, since a tamper proof regulator can be set below the normal tire pressure level for a medium truck tire, and the tire will therefore be protected from over-inflation. This ensures that the tire is inflated with dry air through the applicator, and avoids any subsequent negative effect of moisture trapped inside the tire casing.

A final topping-up of air pressure is achieved with a standard. airline, and the valve core is re-installed in the valve stem. The self-sealing valve cap is screwed over the valve stem on the tire, all as is well known in the art.

Thus the installation of balancing material into a tire assembly is extremely easy, eliminating the need for any special operator skills.

It is also possible to adapt the principle of the invention to smaller, one-shot applicators, for the purpose of installing balancing materials into passenger, motorcycle and other tires on a limited or one-time basis. In such cases, the filling chamber may consist of a plastic container in which the balancing material is packaged, and which may screw directly on to the filter head. The filter head may be of simpler design, and dispense with the air-drying filter entirely. The air-flow may be provided by a low-pressure airline, or by means of an aerosol container. The inlet/outlet valves may be dispensed with entirely, by providing a seal on the plastic container that is broken when the plastic container is attached to the filter head. Alternatively, the outlet valve may be replaced by a valve actuated by a pistol trigger. The air-hose would be replaced by a clear plastic tube and coupling that would screw directly onto the valve stem.

The description of the preferred embodiments is intended to be illustrative, but not limiting, of the apparatus. It will be apparent to persons skilled in the art that one may modify the preferred embodiments described without departing from the substance of the invention.

The embodiments of the invention in which an exclusive property or privilege is claimed are defined as follows:

1. An apparatus for introducing a free-flowing balancing material into a tire through a tire valve stem comprising:
    (a) a container for confining a predefined amount of free-flowing balancing material; said container having means for introducing the free-flowing balancing material into the container, and an opening through which the free-flowing balancing material is drawn when subjected to pressurized air currents;
    (b) a source of pressurized air;
    (c) a flow path for pressurized air extending from said source of pressurized air to an air inlet, from said air inlet to a mixing chamber in communication with said container through said opening, and from the mixing chamber directly to an air outlet; said flow path having a pressure regulator therein;
    (d) a venturi nozzle within said mixing chamber to accelerate the air flow and lower the air pressure within the mixing chamber to draw the free-flowing balancing material from the container into the mixing chamber and directly to the air outlet; and
    (e) means for introducing the mixture of free-flowing balancing material and pressurized air from said air outlet and introducing same into a tire through the associated tire valve stem;

the volume of said container sufficient to contain an amount of free-flowing balancing material sufficient to effect dynamic balancing of a tire and associated wheel assembly.

2. An apparatus as defined in claim 1 wherein said container includes a pressure equalizing tube extending from the air inlet into said container above said free-flowing balancing material to equalize the air pressure within the container to that entering the air inlet.

3. An apparatus according to claim 2, wherein said air flow is directed through an air filter and drying element located between the air inlet and the venturi of the mixing chamber.

4. A method of introducing a free-flowing balancing material into a tire through a tire valve stem comprising the steps of:

(a) confining a predetermined amount of free-flowing balancing material within a container having an opening at one end thereof;

(b) creating a flow path for directing pressurized air through a filter and drying element and then by the opening of the container and having a venturi located upstream of the opening for creating a region of lower pressure within the flow path in the region of said opening for drawing said free-flowing balancing material out of said container and into said air flow path; and (c) directing said free-flowing balancing material in said air flow path into a tire through an associated tire valve stem.

5. A method according to claim 4 wherein a portion of said pressurized air in said flow path and before said venturi, is directed into said container above said free-flowing balancing material to equalize the air pressure within the container with the air pressure in the flow path.

6. An apparatus for introducing a free-flowing balancing material into a tire through a tire valve stem comprising:

(a) a container for confining a predefined amount of free-flowing balancing material; said container having means for introducing the free-flowing balancing material into the container, and an opening through which the free-flowing balancing material is drawn when subjected to pressurized air currents;

(b) a source of pressurized air;

(c) a flow path for pressurized air extending from said source of pressurized air to an air inlet, from said air inlet to a mixing chamber in communication with said container through said opening, and from the mixing chamber to an air outlet; said flow path having a pressure regulator therein;

(d) a venturi nozzle within said mixing chamber to accelerate the air flow and lower the air pressure within the mixing chamber to draw the free-flowing balancing material from the container into the mixing chamber; and (e) an air filter and drying element between the air inlet and the venturi of the mixing chamber, and forming a part of the flow path therebetween, (f) means for introducing the mixture of free-flowing balancing material and pressurized air from said air outlet and introducing same into a tire through the associated tire valve stem; the volume of said container sufficient to contain an amount of free-flowing balancing material sufficient to effect dynamic balancing of a tire and associated wheel assembly.

7. An apparatus according to claim 6 wherein the container includes a removable, sealable cap at the top thereof to allow for the introduction of free-flowing balancing material into the container.

8. An apparatus according to claim 7 wherein said removable cap is fitted with an O-ring that is free to rotate with a groove provided within said cap.

9. An apparatus according to claim 6 wherein said venturi nozzle includes a filter to prevent the free-flowing balancing material from entering the air filter form the venturi nozzle.

* * * * *